United States Patent
Ritter et al.

(10) Patent No.: US 11,428,553 B2
(45) Date of Patent: Aug. 30, 2022

(54) METHOD FOR PRODUCING A CUSTOMER-SPECIFIC SENSOR

(71) Applicant: TrueDyne Sensors AG, Reinach (CH)

(72) Inventors: Josua Ritter, Reinach (CH); Patrick Reith, Basel (CH); Fabio Schraner, Basel (CH)

(73) Assignee: TRUEDYNE SENSORS AG, Reinach (CH)

( * ) Notice: Subject to any disclaimer, the term of this patent is extended or adjusted under 35 U.S.C. 154(b) by 0 days.

(21) Appl. No.: 16/956,601

(22) PCT Filed: Nov. 15, 2018

(86) PCT No.: PCT/EP2018/081338
§ 371 (c)(1),
(2) Date: Jun. 21, 2020

(87) PCT Pub. No.: WO2019/120785
PCT Pub. Date: Jun. 27, 2019

(65) Prior Publication Data
US 2020/0386586 A1 Dec. 10, 2020

(30) Foreign Application Priority Data
Dec. 22, 2017 (DE) ...................... 10 2017 131 099.1

(51) Int. Cl.
*G01D 18/00* (2006.01)
*G01D 21/02* (2006.01)

(52) U.S. Cl.
CPC ............. *G01D 18/00* (2013.01); *G01D 21/02* (2013.01)

(58) Field of Classification Search
CPC ............................... G01D 18/00; G01D 21/02
See application file for complete search history.

(56) References Cited

U.S. PATENT DOCUMENTS

2015/0192439 A1* 7/2015 Mihelich ................ G01D 18/00
  702/104
2016/0356632 A1* 12/2016 Madabushi .......... G01D 18/002

FOREIGN PATENT DOCUMENTS

CN      104135601 A    11/2014
CN      105479489 A     4/2016
(Continued)

OTHER PUBLICATIONS

Wikipedia, Konfiguration (Computer), https://de.wikipedia.org/w/index.php?title=Konfiguration (Computer)&oldid=170505454, 2 pp. (last accessed May 9, 2018).
(Continued)

*Primary Examiner* — Daniel R Miller
*Assistant Examiner* — Eric Sebastian Von Wald
(74) *Attorney, Agent, or Firm* — Mark A. Logan; Endress+Hauser (USA) Holding Inc.

(57) ABSTRACT

The invention relates to a method for producing a customer-specific sensor on the basis of a standard sensor using a sensor development package, the sensor development package comprising at least the standard sensor and a customization unit, and the method for producing the customer-specific sensor having at least the following steps: customizing the customization unit to an application designated by a customer; introducing the sensor development package into the designated application of the customer so that the customer can test the sensor development package in the application; testing the sensor development package introduced into the designated application, by the customer; and producing the customer-specific sensor.

5 Claims, 1 Drawing Sheet

(56) References Cited

FOREIGN PATENT DOCUMENTS

| | | | |
|---|---|---|---|
| CN | 105607914 A | 5/2016 | |
| DE | 102006054421 A1 | 5/2008 | |
| DE | 102008047433 A1 | 3/2010 | |
| DE | 102014219610 A1 * | 3/2016 | ............. B60T 8/171 |
| DE | 102014219610 A1 | 3/2016 | |
| KR | 20160138662 A | 12/2016 | |

OTHER PUBLICATIONS

Wikipedia, Spezifikation, https://de.wikipedia.org/w/index.phip?title=Spezifikation&oldid=168236308, 2 pp. (last accessed May 9, 2018).

* cited by examiner

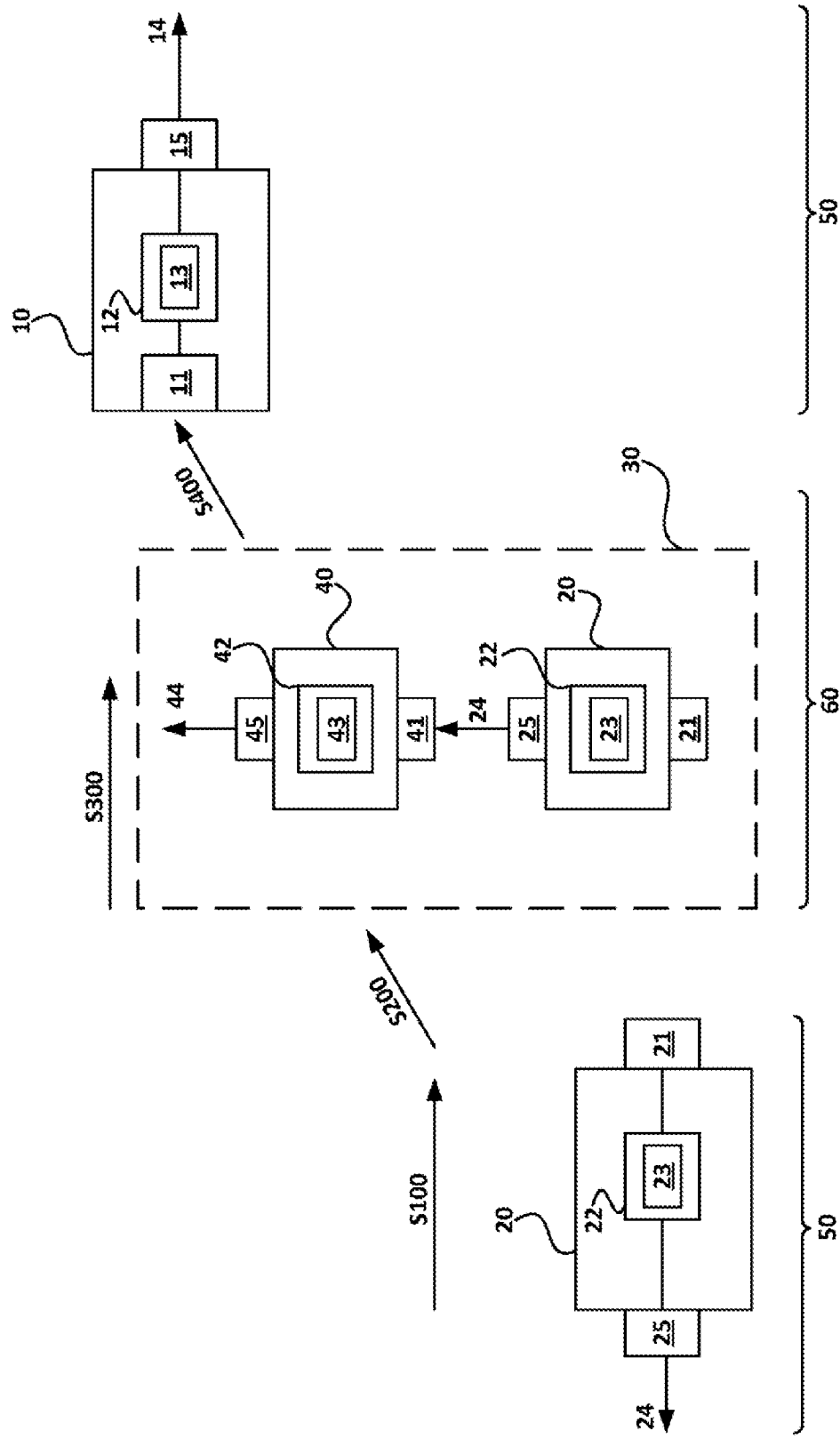

METHOD FOR PRODUCING A CUSTOMER-SPECIFIC SENSOR

CROSS-REFERENCE TO RELATED APPLICATIONS

The present application is related to and claims the priority benefit of German Patent Application No. 10 2017 131 099.1, filed on Dec. 22, 2017 and International Patent Application No. PCT/EP2018/081338, filed on Nov. 15, 2018, the entire contents of which are incorporated herein by reference.

TECHNICAL FIELD

The invention relates to a method for producing a customer-specific sensor.

BACKGROUND

In process automation technology as well as in manufacturing automation technology, sensors for detecting and/or influencing process variables are typically used. Sensors are technical components that can qualitatively or quantitatively detect as a measurand or indeed influence certain physical or chemical parameters, e.g. quantity of heat, temperature, humidity, pressure, sound field parameters, brightness, acceleration, pH, ionic strength, electrochemical potential, etc., and/or material properties of the environment. These parameters are detected by means of physical or chemical effects and transformed into a further processable electrical signal.

For cost reasons, such sensors are usually manufactured as so-called standard sensors in large quantities with always identical equipment features, especially with regard to the parameter to be measured and/or the interface for outputting the measurement values.

Standard sensors are therefore not always the optimal solution for a customer's desired application, in which, for example, a specific parameter must be measured that a standard sensor does not provide.

Due to this, manufacturers of standard sensors also increasingly develop and manufacture customer-specific sensors tailored to customer requirements for a desired application. Such sensors, which are also referred to as OEM (original equipment manufacturer) sensors, are very strongly based on the standard sensors that have already been developed and are usually modified according to the customer specifications only in some respects, for example the measurand that the sensor outputs and/or the interface via which the measurement value is output.

Since customers are generally not willing to pay for technical features of the sensor which are not required or which are only devised for future possible expansions, OEM sensors are very cost-sensitive. As a result, OEM sensors are usually relatively stripped-down and equipped with only the most essential technical features. On the other hand, in the preliminary development of such OEM sensors the technical features are often not yet all fixed and over-engineering inevitably occurs so that all the technical features desired by the customer are available later.

Accordingly, it is desirable to produce customer-specific sensors and OEM sensors to be as stripped-down as possible.

It is therefore an object of the invention to propose a method for producing a customer-specific sensor by means of which a customer-specific sensor that is as stripped-down as possible can be produced.

SUMMARY

The method according to the invention for producing a customer-specific sensor on the basis of a standard sensor using a sensor development package provides that the standard sensor comprises at least one sensor element for detecting a process variable, a first computing unit configured to calculate a standard measurement value based on the detected process variable using a standard algorithm, and a standard interface for outputting standard measurement values, wherein the sensor development package comprises at least the standard sensor and a customization unit, wherein the customization unit comprises at least one first interface corresponding to the standard interface for transmitting the standard measurement value, a second computing unit configured to calculate customer-specific customized measurement values based on the standard measurement values using a customizable customization algorithm and a customer-specific customizable interface for outputting the customer-specific customized measurement values and wherein the method for producing the customer-specific sensor comprises at least the following steps:

Customizing the customization unit to an application desired by a customer in such a way that at least the customization algorithm and/or the customer-specific customizable interface of the customization unit is matched to the application desired by the customer;

Conveying the sensor development package to the customer so that the customer can introduce the sensor development package into the desired application;

Testing by the customer of the sensor development package introduced into the desired application in such a way that the customer compares the customer-specific customized measurement values generated by the sensor development package in the desired application to expected values;

Producing the customer-specific sensor in such a way that the customer-specific sensor comprises at least one computing unit with a customer-specific algorithm whose functioning corresponds to a combination of the standard algorithm of the standard sensor and the customization algorithm of the customization unit, and a customer-specific interface corresponding to the interface of the customization unit customized for the desired application of the customer, so that the produced customer-specific sensor outputs the customer-specific measurement values via the customer-specific interface.

The invention therefore proposes using a sensor development package consisting of a customization unit and the standard sensor for testing in a customer application. For this purpose, the customization unit is first adjusted to the customer's needs in advance. For example, the interface desired by the customer is determined, and the customization algorithm is customized in such a way that the measurand desired by the customer is output. The customer then has the option of testing the standard sensor in combination with the customization unit as a sensor development package in the desired application themselves.

After testing of the standard sensor which is matched precisely to the customers wishes by means of the customization unit, a customer-specific sensor with precisely the technical features as the standard sensor in combination with the customization unit has can be developed and produced.

This procedure offers the advantage that the customer has the possibility of testing the sensor development package, which acts like a later OEM sensor will, in an early stage of the development process. Moreover, the procedure offers the advantage that the OEM sensor to be developed and manufactured need not be overburdened with technical features, since the precise required technical features are or will be known early on as a result of testing on the application.

An advantageous embodiment of the method according to the invention further provides the step of optimizing the customization unit in the event that the customer-specific customized measurement values generated by the sensor development package in the desired application do not correspond to the expected values, the optimization taking place in such a way that at least the customization algorithm and/or the customer-specific customizable interface of the customization unit are readjusted to the desired application.

A further advantageous embodiment of the method according to the invention provides that the customization unit is configured in such a way that a plurality of standard sensors can be connected and the customization algorithm is customized such that the customer-specific customized measurement value is calculated based on the standard measurement values of the plurality of standard sensors.

A further advantageous embodiment of the method according to the invention provides that a single-board computer, especially a Raspberry Pi or a variant derived therefrom, is used as the customization unit.

A further advantageous embodiment of the method according to the invention provides that the standard interface and the first interface are designed as an I2C interface.

A further advantageous embodiment of the method according to the invention provides that the customer-specific customizable interface of the customization unit is realized by a plurality of different individual interfaces and the customer-specific customization is carried out by selecting a single interface.

BRIEF DESCRIPTION OF THE DRAWINGS

The invention is explained in more detail with reference to the following drawing. It shows:

FIG. 1 shows a schematic process flow of the method according to the invention.

DETAILED DESCRIPTION

FIG. 1 shows a schematic process flow of the method according to the invention, in which a customer-specific sensor 10 is produced using a sensor development package 30 which comprises a standard sensor 20 and a customization unit 40.

The standard sensor 20 comprises at least one sensor or transducer element 21, a first computing unit 22, for example a microprocessor, on which a standard algorithm 23 is implemented, and a standard interface 25 via which the standard measurement values 24 are output. A physical and/or chemical parameter is converted by means of the sensor or transducer element 21 into a further processable electrical signal which is supplied to the first computing unit 22 so that corresponding standard measurement values 24 are determined or calculated using the standard algorithm 23. The standard measurement values 24 are output again via a standard interface 25 or are available for access thereon. The standard sensor 20 illustrated in FIG. 1 can, for example, be designed such that, in a filling process in which a medium is filled into a container, the standard sensor 20 determines the density, temperature and pressure of the medium as an application. The parameters can be provided, for example, via an RS232 interface as the standard interface 25.

The customization unit 40 comprises at least a first interface 41, a second computing unit 42, for example, a microprocessor, on which a customization algorithm 43 is implemented, and a customer-specific customizable interface 45 via which the customer-specific customized measurement values 44 are output. The first interface 41 of the customization unit 40 is designed in such a way that it is compatible with the standard interface 25 of the standard sensor 20, for example as an R232 or I2C interface, so that the standard measurement values 24 can be transmitted. The standard measurement values 24 obtained or transmitted by the standard sensor 20 can be processed by means of the customization algorithm 43 in such a way that they can be customized or modified specifically for the customer. The customer-specific customized measurement values 44 are in turn made available by the customization unit 40 via a customer-specific customizable interface 45. The customer-specific customizable interface 45 of the customization unit 40 can be realized, for example, in such a way that the customization unit 40 comprises a plurality of predefined interfaces, for example WLAN; USB, Bluetooth or a variant derived therefrom, and a (single) corresponding interface is selected as the customer-specific customized interface 45 according to customer request. The customization unit 40 can preferably be configured as a single-board computer, especially in the form of a Raspberry Pi board, which has a plurality of predefined interfaces.

For clarification of the method according to the invention, assume the customer is focusing on filling a medium into a container as the desired application 60 and the customer wants to know, in addition to the parameters of density, temperature and pressure which the standard sensor 20 supplies, also the parameter of concentration of the medium in the filling process. Let it further be assumed that the customer does not wish to be provided with the information via an RS232 interface provided by the standard sensor 20, but via a USB interface.

The method according to the invention now provides, in a first method step S100, for the customization unit 40 to be combined with the standard sensor 20 to form the sensor development package 30 and customized to an application 60 desired by the customer. This process is preferably carried out in advance at the sensor manufacturer's location, i.e. before the sensor development package 30 is delivered to the customer. Of course, it is also possible for this process to be carried out at the customer's location or at the location of the desired application 60, that is to say, directly on site. As already mentioned, the sensor development package 30 comprises the standard sensor 20, as is usually produced by the sensor manufacturer in large batches, and a customization unit 40, which is customized to the desired application 60.

Staying with the previous example, the customization unit 40 is customized in such a way that the customization algorithm 43 uses the parameters of density, temperature and pressure supplied by the standard sensor 20 to additionally calculate the concentration as a further parameter and makes this available to the customization unit 40 via the USB interface. Thus, in combination with the standard sensor 20 the customization unit 40 results in a sensor development package 30 which is customized to the desired application 60.

In a second method step S200, the method according to the invention provides that the sensor development package 30 customized to the desired application 60 is introduced into the application 60, so that the customer can test the sensor development package 30. The customer-specific customized interface 45 can thus be tested in the application 60 in addition to the calculation model created by the customization algorithm 43.

In a next method step S300, the customer can test the technical specifications of the sensor development package 30 in the desired application 60.

In a next optional method step, it can be provided for the customization unit 40 to be re-customized in the event that the sensor development package 30 does not meet the customer's technical specifications. Here again, the interface and/or the customization algorithm can be customized. This optional method step is repeated until the sensor development package 30 introduced into the application 60 satisfies the customer's technical specifications.

As soon as the sensor development package 30 integrated into the application 60 corresponds to the technical specifications of the customer, a customer-specific sensor 10 equivalent to the sensor development package 30 is produced by the sensor manufacturer 50 in a next method step S400. The customer-specific sensor 10 produced comprises at least one computing unit 12 with a customer-specific algorithm 13 whose functioning corresponds to the combination of the standard algorithm 23 of the standard sensor 20 and the customization algorithm 43 of the customization unit 40. In accordance with the example described above, the customer-specific algorithm 13 is configured to output as customer-specific measurement values 14 the parameters of density, temperature, pressure and additionally concentration.

Furthermore, the produced custom-specific sensor 10 comprises a (single) customer-specific interface 15 which corresponds to the interface 45 of the customization unit 40 customized for the desired application 60 of the customer, so that the customer-specific measurement values 14 are output via the customer-specific interface 15.

The invention claimed is:

1. A method for producing a customer-specific sensor, comprising:
    providing a standard sensor, including:
        a sensor element for detecting a process variable;
        a first computing unit configured to calculate a standard measurement value based on the detected process variable using a standard algorithm; and
        a standard interface for outputting the standard measurement value;
    providing a sensor development package, including:
        the standard sensor, and
        a customization unit embodied as a single-board computer, including:
            a first interface configured to connect with the standard interface and to receive from the standard interface the standard measurement value;
            a second computing unit configured to calculate a customized measurement value based on the standard measurement value using a customizable customization algorithm; and
            a customizable interface for outputting the customized measurement value;
    customizing the customization unit to a designated application such that the customization algorithm or the customizable interface is matched to the designated application;
    introducing the sensor development package into the designated application such that the sensor development package can be tested in the designated application;
    testing against defined technical specifications the sensor development package introduces into the designated application;
    generating by the sensor development package the customized measurement value in the designated application;
    optimizing the customization unit by re-adjusting the customization algorithm or the customizable interface to the designated application in response to a determination that the customized measurement value generated in the designated application does not correspond to an expected value; and
    producing, in response to a determination that the sensor development package meets the defined technical specifications, the customer-specific sensor including:
        a computing unit with a customer-specific algorithm whose functioning corresponds to a combination of the standard algorithm of the standard sensor and the customization algorithm of the customization unit; and
        a customer-specific interface corresponding to the customizable interface of the customization unit, wherein the customer-specific interface is customized for the designated application, and wherein the customer-specific interface is configured to output the customized measurement value.

2. The method of claim 1, wherein the customization unit is configured in such a way that a plurality of standard sensors can be connected and the customization algorithm is customized such that the customized measurement value is generated based on the standard measurement values of the plurality of standard sensors.

3. The method of claim 1, wherein a single-board computer is used as the customization unit.

4. The method of claim 1, wherein the standard interface and the first interface are configured as an I2C interface.

5. The method of claim 1, wherein the customer-specific customizable interface of the customization unit is realized by a plurality of different individual interfaces and the customizing of the customization unit is carried out by selecting a single interface of the plurality of different individual interfaces.

* * * * *